(12) United States Patent
Kumar et al.

(10) Patent No.: US 9,229,870 B1
(45) Date of Patent: Jan. 5, 2016

(54) MANAGING CACHE SYSTEMS OF STORAGE SYSTEMS

(71) Applicant: EMC Corporation, Hopkinton, MA (US)

(72) Inventors: Naveen Kumar, Worcester, MA (US); Muzhar S. Khokhar, Shrewsbury, MA (US); Bruce Zimmerman, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 186 days.

(21) Appl. No.: 13/929,490

(22) Filed: Jun. 27, 2013

(51) Int. Cl.
*G06F 12/08* (2006.01)
*G06F 12/02* (2006.01)

(52) U.S. Cl.
CPC ........ *G06F 12/0868* (2013.01); *G06F 12/0246* (2013.01); *G06F 12/0891* (2013.01)

(58) Field of Classification Search
USPC .......................................................... 711/103
See application file for complete search history.

(56) References Cited

U.S. PATENT DOCUMENTS

| 7,165,129 B1* | 1/2007 | Okmianski et al. ............. 710/52 |
| 2003/0200388 A1* | 10/2003 | Hetrick ......................... 711/114 |
| 2005/0055512 A1* | 3/2005 | Kishi ............................ 711/135 |
| 2006/0046709 A1* | 3/2006 | Krumm et al. ............. 455/422.1 |
| 2013/0162664 A1* | 6/2013 | Peacock et al. ............... 345/543 |

* cited by examiner

*Primary Examiner* — Jared Rutz
*Assistant Examiner* — Hamdy S Ahmed
(74) *Attorney, Agent, or Firm* — Krishnendu Gupta; Jason A. Reyes; Deepika Bhayana (57) ABSTRACT

A method is used in managing cache systems of storage systems. Information is gathered from a storage system to determine an estimated amount of time required to flush data of a nonvolatile cache of the storage system to storage devices. The data cached in the nonvolatile cache is associated with a set of logical objects configured to cache the data in the nonvolatile cache. Based on the information gathered from the storage system, the estimated amount of time required to flush the data of the nonvolatile cache is determined.

18 Claims, 4 Drawing Sheets

FIG. 4 ical Field
This application relates to managing cache systems of storage systems.

MANAGING CACHE SYSTEMS OF STORAGE SYSTEMS

BACKGROUND

1. Technical Field

This application relates to managing cache systems of storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems (also referred to as "storage array" or simply "array") may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Further, disk arrays included in a data storage system may use a variety of storage devices with various characteristics for providing storage to a user. Each disk array may logically operate as a unified storage device. A data storage system may also include one or more storage array processors (SPs), for handling requests for storage allocation and input/output (I/O) requests. A storage processor (SP) in a disk array is the controller for and primary interface to the disk array. Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a unified disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level. LUNs are managed for use at the application level by paired storage processors (SPs). Ownership of a LUN is determined when the LUN is mounted by the application, with one of the paired SPs designated as the owner SP and the other SP acting as a backup processing device for the owner SP.

SUMMARY OF THE INVENTION

A method is used in managing cache systems of storage systems. Information is gathered from a storage system to determine an estimated amount of time required to flush data of a nonvolatile cache of the storage system to storage devices. The data cached in the nonvolatile cache is associated with a set of logical objects configured to cache the data in the nonvolatile cache. Based on the information gathered from the storage system, the estimated amount of time required to flush the data of the nonvolatile cache is determined.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing cache systems of storage systems, which technique may be used to provide, among other things, gathering information from a storage system to determine an estimated amount of time required to flush data of a nonvolatile cache of the storage system to storage devices, where the data cached in the nonvolatile cache is associated with a set of logical objects configured to cache the data in the nonvolatile cache, and based on the information gathered from the storage system, determining the estimated amount of time required to flush the data of the nonvolatile cache.

Generally, to facilitate uninterrupted operation of a host or server as the host reads and writes data from and to a storage system, as well as executes application programs for use by users, the storage system may use a write cache that allows data from the server to be temporarily stored in the write cache prior to being written to a storage device. As such, the server can send data to the storage system and quickly be provided an acknowledgement that the storage system has stored the data. The acknowledgement is sent even though the storage system has only stored the data in the write cache and is waiting for an appropriate, convenient time to store the data on a physical storage device. Further, a write cache may be organized on a volatile memory (e.g. DRAM ("Direct Random Access Memory") or Dual In-line Memory Module (DIMM)) of a storage system. As known in the art, storing data to a write cache is typically much faster than storing data directly to physical storage devices such as hard disk drives. Consequently, the write cache buffers a large amount of data in anticipation of subsequently storing that data to a physical storage device.

Further, a storage system in addition to using a write cache organized in a volatile memory, may also use a secondary storage as a cache organized on a non-volatile memory such as flash storage (e.g. solid state drives, EEPROM (electrically erasable programmable read-only memory)). Thus, a cache organized on a non-volatile memory such as a flash storage may either extend or replace existing caching capability of a storage system thereby improving overall system performance. Thus, functionality of a cache based on a volatile memory (such as a DRAM cache) may be extended by mapping frequently accessed data to a secondary storage such as a flash disk drive which is faster and efficient that a mechanical disk drive such as a hard disk drive. Moreover, such a secondary storage includes a flash disk drive which provides a larger capacity disk drive compared to a DRAM cache and thus is able to cache a large amount of data (e.g., up to hundreds of gigabytes to a few terabytes) of a data storage system. Thus, a cache organized on a flash drive makes efficient use of a large capacity of the flash drive by storing frequently accessed data of a storage system in the flash drive.

Thus, generally, memory used for storing data of a write cache may be characterized as a persistent memory such as DRAM memory on a storage processor of a storage system that is made more durable than other memory because it has its contents preserved across storage processor crashes and resets, so long as power is not lost, and software of the storage system was able to flush the write cache to the persistent memory. Such persistent memory may have its contents preserved by BIOS of a storage processor. Upon the occurrence of a primary power loss, a write cache may have its data stored (e.g., vaulted) on a form of non-volatile media while providing a backup power source (e.g., such as battery power) and copying the data to the non-volatile media. Thus, I/O data cached in a write cache is dumped to a specific storage drive (also referred to as "vault drive") and not necessarily to a target disk drive to which the I/O data is directed to. A write cache is typically small in size (e.g., few gigabytes). Thus, dumping contents of a write cache does not take a large amount of time.

A cache system organized on non-volatile memory storage such as a flash drive may be used by a logical volume such that data of the logical volume is cached in the cache system. Further, a logical volume configured for using a cache based on a flash storage (also referred to herein as "flash cache") may support a read and write operation which is protected by a RAID group. I/O data cached in a flash cache organized on non-volatile memory storage media is flushed to target drives to which the I/O data is directed to. Generally, a flash cache is large in size (e.g. few hundred gigabytes). A flash cache is organized on flash disk drives (such as a Solid State Drive (SSD)) which are persistent in nature and does not require a battery during a power failure in order to dump contents of the flash cache to target disk drives. Further, a flash cache not only stores user data but also caches metadata. A flash cache may be used in addition to a write cache. Further, a flash cache may also be used instead of a write cache.

Further, options such as a capacity configuration for a logical volume configured for using a flash cache may depend upon configuration of a storage system and a type of flash disk drives used for organizing the flash cache. Thus, a user may create a flash cache on a storage system, enable a set of logical volumes to use the flash cache, and manage the flash cache through a system management user interface thereby enabling applications executing on the storage system to start using the flash cache which in turns improves performance of the applications and the storage system.

Generally, data cached in a flash cache may need to be dumped to target disk drives for various reasons such as a change in configuration of a system, an update of software or hardware of a storage system, disabling a fast cache, scheduling of a maintenance window, and a recovery of a storage pool. Conventionally, the amount of time required to flush contents of a flash cache to storage devices is un-deterministic and the process of flushing the flash cache is a manual process. Further, in such a conventional system, the amount of time required to dump data of a flash cache to storage devices may depend upon configuration of a storage system and system information such as the number of disk drives in the flash cache, the type of drives in the storage devices, the number of LUNs, and the type of a RAID group. Conventionally, no mechanism exists to determine an estimated amount of time it takes to flush data cached in a fast cache to storage devices of a storage system. Thus, in such a conventional system, a storage system expert (such as a storage system administrator, a support engineer) is unable to provide to a user of a storage system either a definitive or an estimated amount of time required to flush contents of a flash cache to a storage disk drives. Thus, in such a conventional system, a user of a storage system is unable to schedule shutdown of a storage system during a specific time period as the user is unable to predict an estimated amount of time required to dump contents of a flash cache in order to bring the storage system to a consistent state. Further, in such a conventional system, the amount of time required to dump contents of a flash cache may vary significantly from a few hours to a few days. Thus, in such a conventional system, a user of a storage system is unable to predict the amount of time required to dump cached data of a flash cache thereby unable to efficiently manage storage operations on a storage system such as plan a recovery process for storage pools.

By contrast, in at least some implementations in accordance with the technique as described herein, use of a mechanism to determine an estimated amount of time required to flush contents of a flash cache of a storage system to a storage disk enables customer to efficiently manage the storage system. Thus, in at least one embodiment of the current technique, a utility which executes on a storage processor of a storage system may determine an estimated amount of time required to flush contents of a flash cache by applying a predictive analysis technique thereby enabling users of a storage system to efficiently plan and manage operations in a storage system environment.

In at least some implementations in accordance with the technique as described herein, the use of managing cache systems of storage systems can provide one or more of the following advantages: simplifying a process of managing a storage system by enabling a user of the storage system to plan a shutdown of the storage system effectively, efficiently managing a data storage system by determining an estimated amount of time required to flush a cache, and improving storage system management decisions made by a storage user by providing information regarding a cache system to the storage user.

Figure 1:
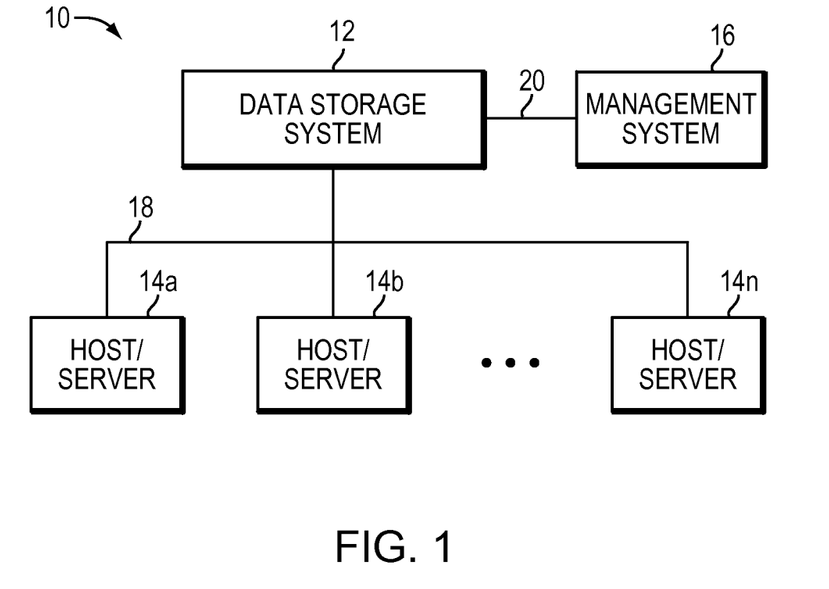
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, configure logical volume to enable use of a non-volatile memory based cache (e.g. a flash cache organized on a flash disk drive) and the like.

In one embodiment, the one or more data storage systems 12 of FIG. 1 may be an appliance with hardware and software for hosting the data storage of the one or more applications executing on the hosts 14a-14n. In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for managing cache systems in data storage systems.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
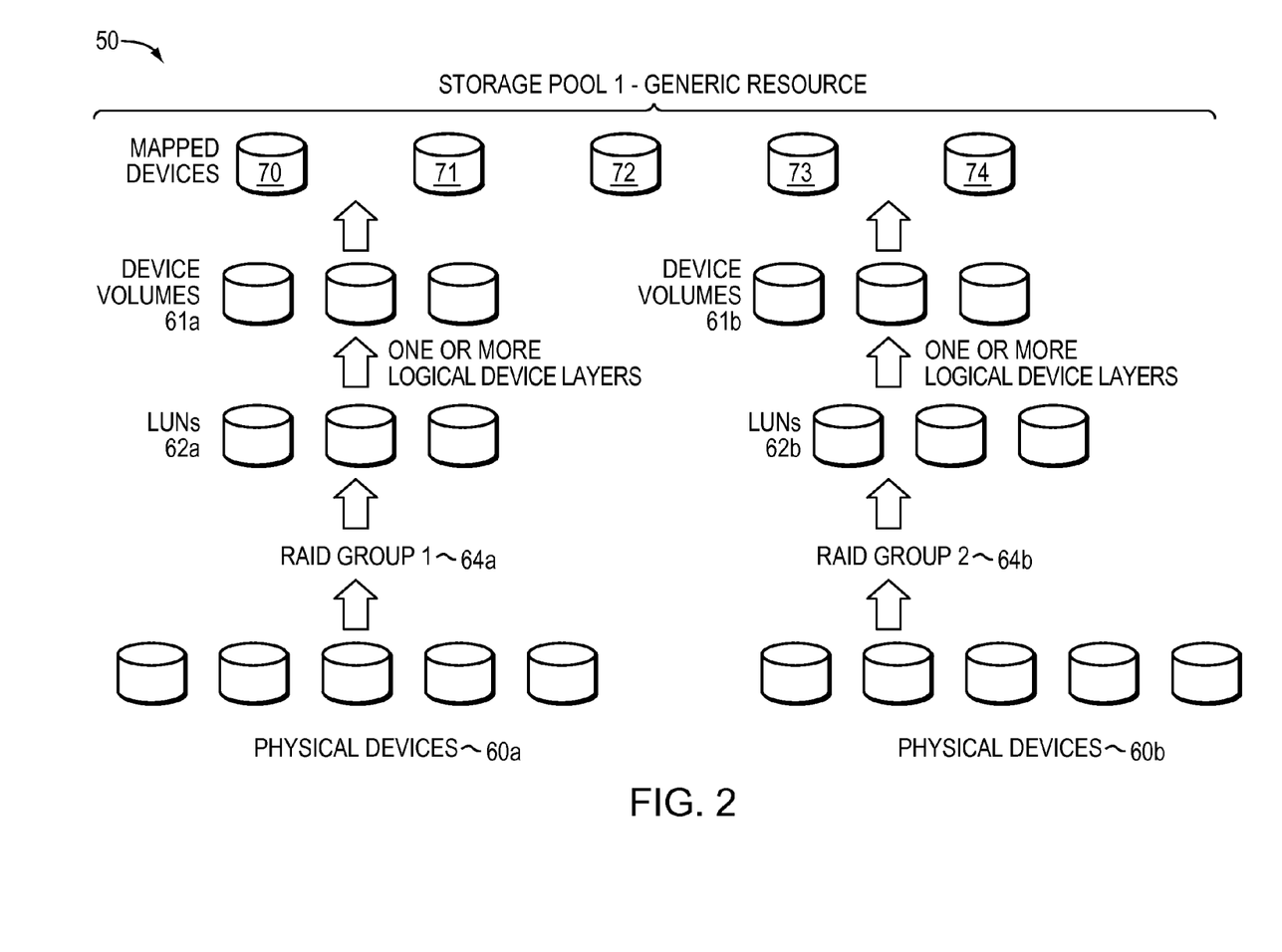
FIG. 2 is an example illustrating storage device layout.

Referring to FIG. 2, shown is an example representing how data storage system best practices may be used to form storage pools. A storage pool may be a collection of disks, which may include disks of different types. Storage pools may further be subdivided into slices; for example a 1 GB slice may be the allocation element for a logical unit. It should be noted that a slice of any other size (e.g. 2 GB) may also be used for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved.

A disk may be a physical disk within the storage system. A LUN may be a logical unit number which is an identifier for a Logical Unit. Each slice of data may have a mapping on the location of the physical drive where it starts and ends; a slice may be sliced again.

In at least one embodiment of the current technique, the example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

The data storage system best practices may define how to configure or form the generic storage pools, each storage pool having an associated generic storage pool type. Each underlying data storage system may have associated best practices specifying how to configure storage pools formed from physical devices in that particular data storage system. A storage extent may be formed or configured from one or more LUNs 62a-b.

Figure 3:
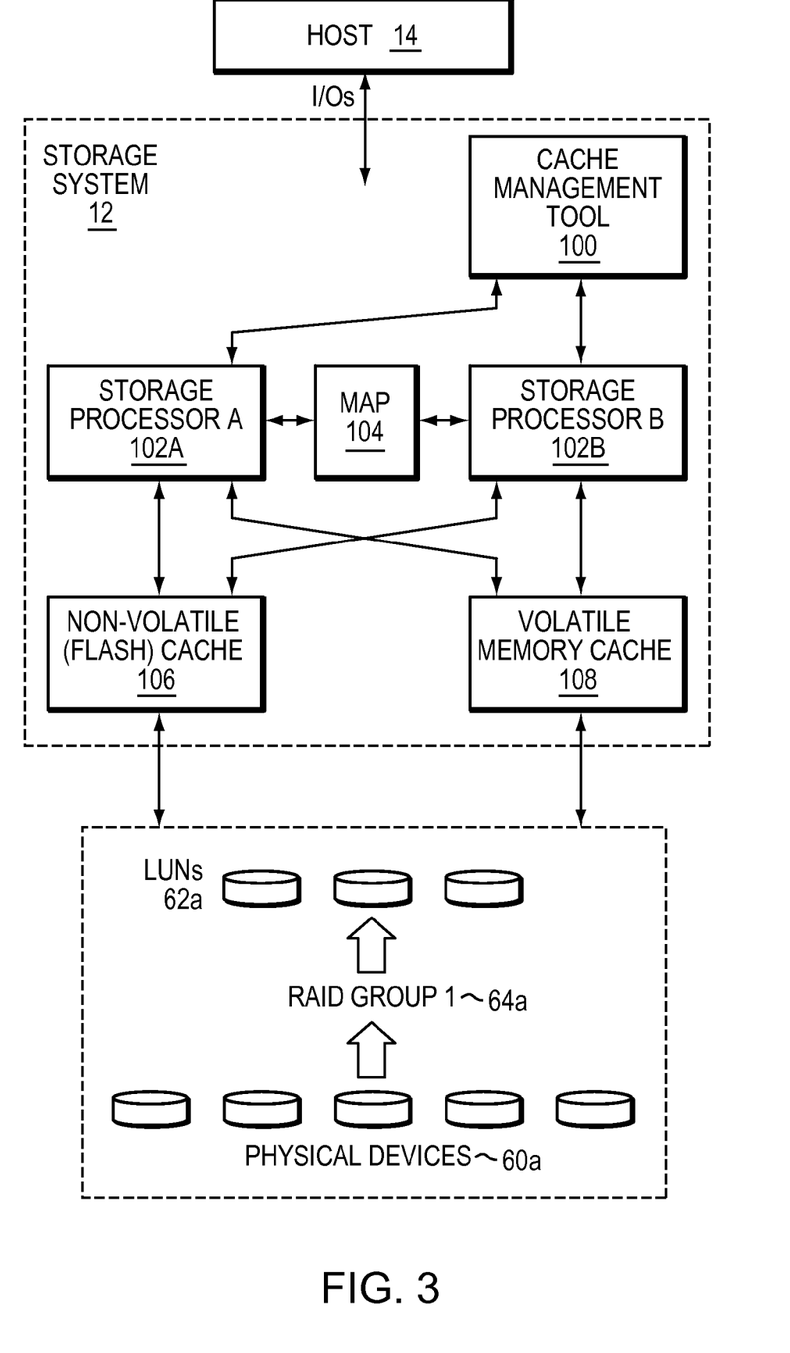
FIG. 3 is a diagram illustrating in more detail components that may be used in connection with techniques herein.

Referring to FIG. 3, shown is a more detailed representation of components that may be included in an embodiment using the techniques described herein. In at least some embodiments of the current technique, a logical unit 62a or a storage pool including a set of logical units may be configured to use a non-volatile memory based cache system 106 (e.g. a flash cache organized on a flash drive) such that data associated with an I/O request received from a host system 14 is cached in the flash cache 106. Further, data associated with an I/O request may also be cached in a volatile memory cache 108 (e.g. DRAM write cache).

Thus, if the host system 14 sends a read I/O request to read data and the data resides in the volatile memory cache 108 (e.g. a DRAM write cache), the data is read from the volatile memory cache 108. However, if the data does not reside in the volatile memory cache 108, a determination is made as to whether the data resides in the flash cache 106. Upon determination that the data resides in the flash cache 106, the data is read from the flash cache 106 and after reading the data from the flash cache 106, the data is also stored in volatile memory 108 cache such that subsequent read I/O requests for that data can be completed by reading the data from the volatile memory 108 cache.

Generally, if volatile memory cache 108 is not disabled in a storage system, data associated with write operations are cached in the volatile memory cache 108 such that the data is not written directly to flash cache 106.

In at least one embodiment of the current technique, if the host system 14 sends a write I/O request targeted for a data object (e.g., data block) which reside in flash cache 106, the copy of the data object residing in the volatile cache 108 is updated with new data associated with the write I/O request and an acknowledgement is provided to the host system 14 indicating that the write request has been completed successfully. When a storage system attempts to move data out of volatile memory cache 108, the data is written to fast cache 106 instead of storage disk drives (e.g. Hard disk drives ("HDD")). In such a case, because data is written to flash drives instead of hard disk drives, a write operation is faster and may help reduce the number of dirty pages in a write cache residing in volatile memory 108. Thus, even when fast cache 106 is enabled and configured on a storage system, I/O operations are performed by reading data from volatile memory 106 if the data resides in the volatile memory 106.

In at least one embodiment of the current technique, a map 104 such as a bitmap may be maintained by a storage system such that the map includes information for each LUN of a storage system indicating whether a LUN is configured to use a flash cache. Further, the information for a LUN may indicate status of data cached in flash cache 106 such that a valid copy of data in flash cache 106 indicates that the flash cache and a physical storage device contain the same current copy of the data indicating valid cached data for the portion of the storage device. Further, dirty data in flash cache 106 indicates that the flash cache 106 has the more recent or current copy of the data rather than the physical storage device. This may be the case where such cached data has yet to be dumped to the physical storage device.

Thus, data associated with an I/O request is compared with information stored in map 104 to determine whether the data has been cached in the flash cache 106. Upon determination that the data has not been cached in the flash cache 106, the I/O request is processed by a storage system by reading the data from a storage device. However, if the data has been cached in the cache system 106, the I/O request is redirected to the cache system 106 such that the data is read from the cache system 106 and provided to the host system 14 without having to read the data from the storage device.

In at least one embodiment of the current technique, cache management tool 100 gathers information from storage processors (e.g., storage processor A 102a, storage processor B 102b) of a storage system and provides an estimated time required to flush contents of non-volatile cache 106 to storage devices. One of the prerequisite for executing the cache management tool 100 may be to pause or stop auto tiering process that relocates slices from a storage tier to another storage tier if such process is relocating slices in the storage system 12. Another prerequisite for executing the cache management tool 100 may be to check CPU load of a storage processor. A storage system expert may execute the cache management tool 100 on a storage processor of a storage system.

In at least one embodiment of the current technique, cache management tool 100 gathers real time up-to-date information by executing the tool 100 on a storage processor and provides an estimated amount of time required to dump flash cache 106 based on the real up-to-date information gathered from the storage processor of a storage system. Some of the information taken into consideration by the cache management tool 100 for determining an estimated amount of time required to dump flash cache 106 includes the number of flash disk drives in flash cache 106, the number of pages in the flash cache 106, the type of disk drives on which contents of flash cache 106 is dumped, the RAID type of logical units that are configured to use flash cache 106, and the number of disk drives in a RAID group.

In at least one embodiment of the current technique, in order to determine an estimated amount of time required to dump flash cache 106, cache management tool 100 first gathers information, second processes the information gathered, and third consolidates output of the processing performed on the information and provides result to a user.

In at least one embodiment of the current technique, the first step performed by cache management tool 100 is to gather information from a storage processor when the cache management tool 100 executes on the storage processor. Cache management tool 100 gathers various types of configuration information and real time up-to-date system information of a storage system from a storage processor on which the cache management tool 100 executes. Information gathered by cache management tool 100 includes the number of dirty pages on each storage processor associated with each user LUN. Further, the information gathered by cache management tool 100 includes information regarding RAID type configuration of a storage system. Further, the information gathered by cache management tool 100 includes the number of disk drives in flash cache 106, and the type of disk drives on which flash cache 106 is dumped. Further, the information gathered by cache management tool 100 includes configuration information regarding flash cache 106 and state information of flash cache 106. The RAID group type of flash cache 106 may be based on RAID-10. However, it should be noted that any other RAID group type may be used to organize flash cache 106.

In at least one embodiment of the current technique, the second step performed by cache management tool 100 is to process the information gathered in the first step described above herein. Different types of disk drives write data at different speed to sectors of the disk drives. For example, a Fibre channel (FC) drive may write data at the speed of 180 megabytes per second and a SATA (Serial ATA) disk drive may write data at the speed of 80 megabytes per second. Flash cache 106 uses flash disk drives. Thus, disk drives on which contents of the flash disk drives may be flushed may become a bottleneck as a flash disk drive writes data to the flash disk drive faster than disk drives other than a flash disk drive such as a FC, SATA or SAS drives. Thus, based on the type of a disk drive, the type of a RAID group, and the number of disk drives in flash cache 106, the rate at which data may be written to a disk drive may vary. Further, the number of disk drives in flash cache 106 is an important factor in determining an amount of time required to flush dirty data of the flash cache 106 as the rate at which the dirty data may be written to disk drives depends upon the number of flash drives in flash cache 106.

In at least one embodiment of the current technique, cache management tool 100 may use specification information for disk drives as a reference for determining the rate at which a disk drive writes data. Further, the cache management tool 100 may also use values derived from testing performed in a test environment for determining the rate at which a disk drive may write data.

Further, in at least one embodiment of the current technique, cache management tool 100 determines an amount of time required to flush dirty data cached for each LUN configured to use flash cache 106 separately and saves information in a buffer.

Following are the definitions used in various algorithms used by cache management tool 100 for determining an estimated amount of time required to dump flash cache 106 to storage devices.

FLASH_FR—indicates the rate at which fast cache 106 writes data to storage disk drives.

ND_FLASH—indicates the number of flash disk drives in flash cache 106.

DP—indicates the number of dirty pages associated with each user LUN configured to use flash cache 106.

TDP—indicates the total number of dirty pages in flash cache 106.

ND—indicates the number of disk drive associated with a user LUN.

SPEED—indicates the speed of a specific type of a disk drive (e.g. SAS, SATA, FC).

TTF—indicates an amount of time determined by cache management tool 100 to flush dirty pages for a user LUN configured to use flash cache 106.

MTL—indicates the highest value of TTF among TTF values determined for each user LUN of a storage system which is configured to use flash cache 106.

FT_MAX—indicates a maximum amount of time required to flush flash cache 106.

FT_MIN—indicates a minimum amount of time required to flush flash cache 106.

In at least one embodiment of the current technique, cache management tool 100 determines the value indicated by TTF for each user LUN of a storage system that is configured to use flash cache 106 by using mathematical formulas described below herein.

For RAID-5 or RAID-3, following mathematical formula may be used for computing TTF for a user LUN.

$$TTF=(DP*(ND-1))/(SPEED*ND*64)$$

For RAID-10, following mathematical formula may be used for computing TTF for a user LUN.

$$TTF=(DP*(ND/2))/(SPEED*ND*64)$$

For RAID-6, following mathematical formula may be used for computing TTF for a user LUN.

$$TTF=(DP*(ND-2))/(SPEED*ND*64)$$

The number 64 described above herein indicates the size of a page which may be 64 kilobytes. However, it should be noted that the value 64 used herein may change based on the size of a dirty page in flash cache 106.

In at least one embodiment of the current technique, cache management tool 100 determines MTL which is the highest value of TTF among TTF values determined for each user LUN of a storage system which is configured to use flash cache 106. Cache management tool 100 determines MTL by comparing TTF values for each user LUN which includes dirty pages that are cached in flash cache 106 and determining the highest TTL value among each TTF value. For example, if three RAID groups (RG 50, RG 51, and RG 52) in a storage system include dirty pages that are cached in flash cache 106, MTL is computed as:

$$MTL=MAX(TTF\ for\ RG\ 50, TTF\ for\ RG\ 51, TTF\ for\ RG\ 52).$$

In at least one embodiment of the current technique, a minimum amount of time required to flush flash cache 106 is determined by using following mathematical formula.

$$FT\_MIN=TDP/(FLASH\_FR*ND\_FLASH/2)$$

Further, a maximum amount of time required to flush flash cache 106 is determined by using following mathematical formula.

$$FT\_MAX=FT\_MIN+MTL$$

When determining the minimum amount of time required to flush flash cache 106, cache management tool 100 may make an assumption that a target disk drive may operate at the same or similar speed at which dirty pages are flushed indicating that the target disk drive may be as fast as a flash disk drive. Further, when determining the maximum amount of time required for dumping flash cache 106 to storage devices, cache management tool 100 takes into consideration operating speed of a flash disk drive and the value of MTL.

In at least one embodiment of the current technique, the third step performed by cache management tool 100 is to consolidate output of the processing of the information performed in the second step described above herein. Cache management tool 100 consolidates two output values to provide a result to a user which includes a minimum amount of time required to flush flash cache 106 and a maximum amount of time required to flush flash cache 106. Thus, generally, an amount of time required to dump dirty data of flash cache 106 may be between the maximum and minimum amount of times required to dump flash cache 106 which are computed by cache management tool 100.

In at least one embodiment of the current technique, for example, values for the speed at which disk drives write data may be used as described below herein.

For example, based on a specification, a SAS drive may write data at the speed of 180 megabytes per second. However, in data storage environment, a SAS drive may write data at the speed of 120 megabytes per second. For example, based on a specification, a NL-SAS drive may write data at the speed of 120 megabytes per second. However, in data storage environment, a NL-SAS drive may write data at the speed of 80 megabytes per second. For example, based on a specification, a FC drive may write data at the speed of 180 megabytes per second. However, in data storage environment, a FC drive may write data at the speed of 120 megabytes per second. For example, based on a specification, a SATA drive may write data at the speed of 80 megabytes per second. However, in data storage environment, a SATA drive may write data at the speed of 53 megabytes per second. Similarly, for example, a fast cache 106 may flush data at the rate of 30 megabytes per second in an ideal test environment. However, in a customer environment, the rate at which flash cache 106 may flush data may vary between 13 megabytes per second to 15 megabytes per second.

Figure 4:
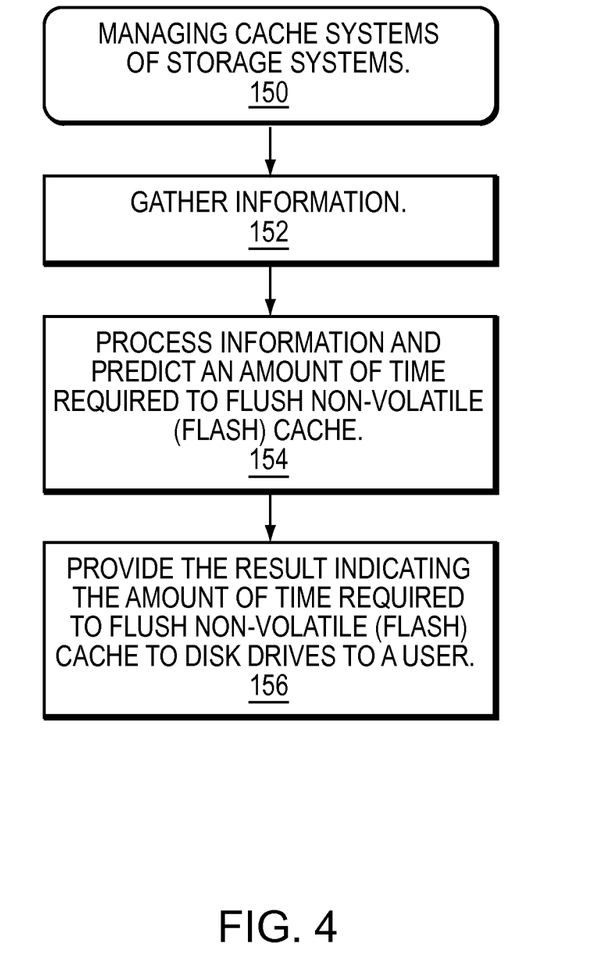
FIG. 4 is a flow diagram illustrating processes that may be used in connection with techniques herein.

Referring to FIG. 4, shown is a more detailed flow diagram illustrating managing cache systems of storage systems. With reference also to FIGS. 1-3, in at least one embodiment of the current technique, cache management tool 100 provides information regarding an amount of time required to dump flash cache 106 to storage devices (step 150). Cache management tool 100 gathers information from a storage processor of a storage system (step 152). The information gathered from the storage processor is processed and a set of predictive analysis techniques are applied on the information gathered by using mathematical formulas described above herein (step 154). Based on the processing of the information, cache management tool 100 provides results to a user indicating an amount of time required to flush flash cache 106 (step 156).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing cache systems of storage systems, the method comprising:

gathering information from a storage system to determine an estimated amount of time required to flush data of a nonvolatile cache of the storage system to storage devices, wherein the data cached in the nonvolatile cache is associated with a set of logical objects configured to cache the data in the nonvolatile cache, wherein the information gathered from the storage system includes the number of storage devices in the nonvolatile cache, the type of storage devices on which the data of the nonvolatile cache is flushed to, and the amount of data in the nonvolatile cache required to be flushed;

based on the information gathered from the storage system, processing the information gathered from the storage system for determining minimum and maximum amount of time required for flushing the data of the nonvolatile cache;

based on the processing, determining the estimated amount of time required to flush the data of the nonvolatile cache; and providing the estimated amount of time to a user of the storage system for managing the storage system.

2. The method of claim 1, wherein the information is gathered in response to receiving a request to determine the estimated amount of time.

3. The method of claim 1, wherein the nonvolatile cache includes a flash storage, wherein the flash storage includes a set of flash disk drives.

4. The method of claim 1, wherein a logical object comprises a set of slices, each slice of the set of slices is a logical representation of a subset of physical disk storage.

5. The method of claim 1, wherein a logical object includes a disk drive system comprising a plurality of Redundant Array of Inexpensive Disks (RAID) systems, each RAID system of the plurality of RAID systems having a first disk drive and a second disk drive.

6. The method of claim 1, further comprising:
determining whether a logical object is configured to cache data in the nonvolatile cache by evaluating information stored in a bitmap.

7. The method of claim 1, further comprising:
executing a cache management tool on a storage processor of the storage system for determining the estimated amount of time required to flush data of the nonvolatile cache.

8. The method of claim 1, further comprising:
based on the processing, consolidating output generated from the information gathered from the storage system; and
providing the output to a user.

9. The method of claim 1, wherein the information gathered for determining the estimated amount of time includes the number of flash disk drives in the nonvolatile cache, the type of disk drives to which the data is flushed, the type of a RAID group for the set of logical objects, and the number of disk drives in the RAID group.

10. A system of managing cache systems of storage systems, the system comprising a processor configured to:
gather information from a storage system to determine an estimated amount of time required to flush data of a nonvolatile cache of the storage system to storage devices, wherein the data cached in the nonvolatile cache is associated with a set of logical objects configured to cache the data in the nonvolatile cache, wherein the information gathered from the storage system includes the number of storage devices in the nonvolatile cache, the type of storage devices on which the data of the nonvolatile cache is flushed to, and the amount of data in the nonvolatile cache required to be flushed;

based on the information gathered from the storage system, process the information gathered from the storage system for determining minimum and maximum amount of time required for flushing the data of the nonvolatile cache;

based on the processing, determine the estimated amount of time required to flush the data of the nonvolatile cache; and provide the estimated amount of time to a user of the storage system for managing the storage system.

11. The system of claim 10, wherein the information is gathered in response to receiving a request to determine the estimated amount of time.

12. The system of claim 10, wherein the nonvolatile cache includes a flash storage, wherein the flash storage includes a set of flash disk drives.

13. The system of claim 10, wherein a logical object comprises a set of slices, each slice of the set of slices is a logical representation of a subset of physical disk storage.

14. The system of claim 10, wherein a logical object includes a disk drive system comprising a plurality of Redundant Array of Inexpensive Disks (RAID) systems, each RAID system of the plurality of RAID systems having a first disk drive and a second disk drive.

15. The system of claim 10, further comprising:
determine whether a logical object is configured to cache data in the nonvolatile cache by evaluating information stored in a bitmap.

16. The system of claim 10, further comprising:
execute a cache management tool on a storage processor of the storage system for determining the estimated amount of time required to flush data of the nonvolatile cache.

17. The system of claim 10, further comprising:
based on the processing, consolidate output generated from the information gathered from the storage system; and
provide the output to a user.

18. The system of claim 10, wherein the information gathered for determining the estimated amount of time includes the number of flash disk drives in the nonvolatile cache, the type of disk drives to which the data is flushed, the type of a RAID group for the set of logical objects, and the number of disk drives in the RAID group.

* * * * *